(12) United States Patent
Bai

(10) Patent No.: US 10,567,028 B2
(45) Date of Patent: *Feb. 18, 2020

(54) MULTIWAY SWITCH, RADIO FREQUENCY SYSTEM, AND WIRELESS COMMUNICATION DEVICE

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,948

(22) Filed: Nov. 7, 2018

(65) Prior Publication Data

US 2019/0288729 A1  Sep. 19, 2019

(30) Foreign Application Priority Data

Mar. 16, 2018 (CN) .......................... 2018 1 0220778

(51) Int. Cl.
*H04B 1/40* (2015.01)
*H04B 1/00* (2006.01)
(Continued)

(52) U.S. Cl.
CPC .............. *H04B 1/40* (2013.01); *H04B 1/005* (2013.01); *H04B 1/44* (2013.01); *H04B 7/0686* (2013.01);
(Continued)

(58) Field of Classification Search
CPC ........ H04B 1/40; H04B 1/005; H04B 7/0686; H04B 1/44; H04W 88/06; H01Q 7/00;
(Continued)

(56) References Cited

U.S. PATENT DOCUMENTS

| | | |
|---|---|---|
| 5,175,878 A | 12/1992 | Davis et al. |
| 8,824,584 B2 | 9/2014 | Kim et al. |

(Continued)

FOREIGN PATENT DOCUMENTS

| | | |
|---|---|---|
| CN | 101867402 A | 10/2010 |
| CN | 202103661 U | 1/2012 |

(Continued)

OTHER PUBLICATIONS

Gao Xiang et al:"Multi-Switch for Antenna Selection in Massive MIMO", 2015 IEEE global communications Conference (GLOBECOM), IEEE, Dec. 6, 2015.

(Continued)

*Primary Examiner* — Syed Haider
(74) *Attorney, Agent, or Firm* — Young Basile Hanlon & MacFarlane, P.C.

(57) ABSTRACT

A multiway switch, a radio frequency system, and a wireless communication device are provided. The multiway switch includes ten T ports and four P ports, the ten T ports include two first T ports, each of which the two first T ports is coupled with all of the four P ports. The multiway switch is configured to be coupled with a radio frequency circuit of a wireless communication device through the ten T ports and an antenna system of the wireless communication device through the four P ports, to implement a preset function of the wireless communication device, the antenna system comprising four antennas corresponding to the four P ports, and the preset function being a function of transmitting a sounding reference signal (SRS) through the four antennas in turn.

20 Claims, 12 Drawing Sheets

(51) Int. Cl.
*H04B 7/06* (2006.01)
*H04Q 3/00* (2006.01)
*H04B 1/44* (2006.01)
*H01Q 7/00* (2006.01)
*H04W 88/06* (2009.01)

(52) U.S. Cl.
CPC ............. *H04Q 3/00* (2013.01); *H04Q 3/0004* (2013.01); *H01Q 7/00* (2013.01); *H04Q 2213/1302* (2013.01); *H04W 88/06* (2013.01)

(58) Field of Classification Search
CPC . H04Q 3/0004; H04Q 3/00; H04Q 2213/1302
See application file for complete search history.

(56) References Cited

U.S. PATENT DOCUMENTS

| | | |
|---|---|---|
| 9,385,795 B1 | 7/2016 | Ananthanarayanan et al. |
| 9,584,211 B2 | 2/2017 | Kang et al. |
| 2009/0054093 A1* | 2/2009 | Kim ................ H04B 7/061 455/500 |
| 2009/0153222 A1 | 6/2009 | Gu |
| 2010/0099366 A1* | 4/2010 | Sugar ................ H04B 1/005 455/75 |
| 2011/0249760 A1 | 10/2011 | Chrisikos et al. |
| 2011/0250926 A1 | 10/2011 | Wieffeldt et al. |
| 2013/0308554 A1 | 11/2013 | Ngai et al. |
| 2013/0309982 A1 | 11/2013 | Yan et al. |
| 2013/0335160 A1* | 12/2013 | Khlat ................ H01P 1/15 333/103 |
| 2014/0140224 A1 | 5/2014 | Hakansson et al. |
| 2014/0235260 A1 | 8/2014 | Zawaideh et al. |
| 2014/0293841 A1 | 10/2014 | Rousu |
| 2014/0334362 A1 | 11/2014 | Granger-Jones |
| 2015/0043593 A1* | 2/2015 | Snowdon ............ H04L 49/254 370/419 |
| 2015/0215011 A1 | 7/2015 | Hartenstein |
| 2015/0295594 A1 | 10/2015 | Kehrer |
| 2016/0006409 A1 | 1/2016 | Keane |
| 2016/0337178 A1 | 11/2016 | Frenne et al. |
| 2017/0012358 A1 | 1/2017 | Feng et al. |
| 2017/0195004 A1* | 7/2017 | Cheng ................ H04B 7/0602 |
| 2017/0202014 A1 | 7/2017 | Moon et al. |
| 2018/0367199 A1 | 12/2018 | Zimmerman |

FOREIGN PATENT DOCUMENTS

| | | |
|---|---|---|
| CN | 103905104 A | 7/2014 |
| CN | 105245295 A | 1/2016 |
| CN | 105703053 A | 6/2016 |
| CN | 106533526 A | 3/2017 |
| CN | 106559277 A | 4/2017 |
| CN | 106685621 A | 5/2017 |
| CN | 106712795 A | 5/2017 |
| CN | 108199730 A | 6/2018 |
| CN | 108390694 A | 8/2018 |
| CN | 108462499 A | 8/2018 |
| CN | 108462506 A | 8/2018 |
| CN | 108512556 A | 9/2018 |
| CN | 108512567 A | 9/2018 |
| EP | 2485555 A1 | 8/2012 |
| WO | 2012026601 A1 | 3/2012 |
| WO | 2012109988 A1 | 8/2012 |

OTHER PUBLICATIONS

Guy Lemieux et al:"Generating highly-routable sparse crossbars for PLDs", FPGA '00. ACM/SIGDA International Symposium on Field Programmable Gate Arrays, Feb. 1, 2000.
Extended European search report issued in corresponding European application No. 18204875.1 dated May 29, 2019.
International search report issued in corresponding international application No. PCT/CN2018/113192 dated Feb. 3, 2019.
International search report issued in corresponding international application No. PCT/CN2018/111027 dated Jan. 17, 2019.

* cited by examiner

MULTIWAY SWITCH, RADIO FREQUENCY SYSTEM, AND WIRELESS COMMUNICATION DEVICE

CROSS-REFERENCE TO RELATED APPLICATION(S)

This application claims priority to Chinese Patent Application No. 201810220778.1, filed on Mar. 16, 2018, the entire disclosure of which is hereby incorporated by reference.

TECHNICAL FIELD

This disclosure relates to the field of communication technology, and particularly to a multiway switch, a radio frequency system, and a wireless communication device.

BACKGROUND

With the widespread use of wireless communication device such as smart phones, the smart phone can support an increasing number of applications and is becoming more and more powerful. The smart phone is developing in a diversified and personalized way, becoming indispensable electronic products in users' life. In the fourth generation (4G) mobile communication system, the wireless communication device generally adopts a single-antenna or dual-antenna radio frequency (RF) system architecture. Currently, in a new radio (NR) system of the fifth generation (5G) mobile communication system, a wireless communication device supporting a four-antenna RF system architecture is proposed.

SUMMARY

Implementations of the disclosure provide a multiway switch, a radio frequency system, and a wireless communication device.

According to a first aspect of implementations of the disclosure, a multiway switch is provided. The multiway switch includes ten throw (T) ports and four pole (P) ports. The ten T ports include two first T ports, each of the two first T ports is coupled with all of the four P ports. The multiway switch is configured to be coupled with a radio frequency circuit of a wireless communication device through the ten T ports and an antenna system of the wireless communication device through the four P ports, to implement a preset function of the wireless communication device. The antenna system includes four antennas corresponding to the four P ports, and the preset function is a function of transmitting a sounding reference signal (SRS) through the four antennas in turn.

According to a second aspect of implementations of the disclosure, a radio frequency system is provided. The radio frequency system includes an antenna system, a radio frequency circuit, and a multiway. The multiway switch includes ten T ports and four P ports, and the ten T ports include two first T ports, each of the two first T ports is coupled with all of the four P ports. The antenna system includes four antennas corresponding to the four P ports.

The multiway switch is configured to be coupled with the radio frequency circuit through the ten T ports and the antenna system through the four P ports, to implement a preset function of the wireless communication device, and the preset function is a function of transmitting an SRS through the four antennas in turn.

According to a third aspect of implementations of the disclosure, a wireless communication device is provided. The wireless communication device includes an antenna system, a radio frequency transceiver, a radio frequency circuit coupled with the radio frequency transceiver, and a multiway switch. The multiway switch includes ten T ports and four P ports, and the ten T ports include two first T ports, each of two first T ports is coupled with all of the four P ports. The antenna system including four antennas corresponding to the four P ports.

The multiway switch is configured to be coupled with the radio frequency circuit through the ten T ports and the antenna system through the four P ports, to implement a preset function of the wireless communication device, and the preset function is a function of transmitting an SRS through the four antennas in turn.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1:
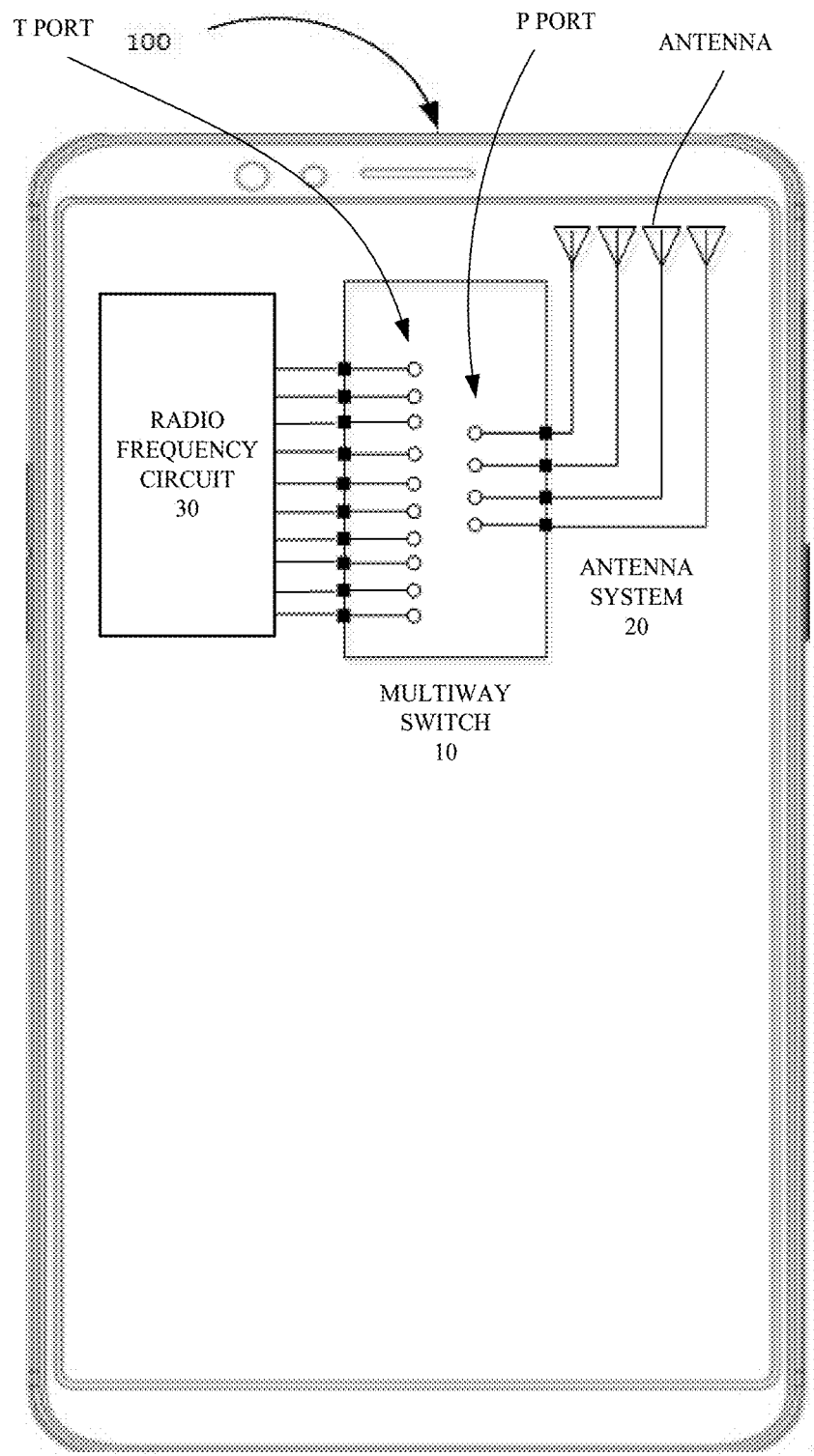
FIG. 1 is a schematic structural diagram illustrating a multiway switch according to an implementation of the disclosure.

Technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can also be included.

The term "embodiment" or "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

According to implementations of the present disclosure, a multiway switch is provided. The multiway switch includes ten throw (T) ports and four pole (P) ports. The ten T ports include two first T ports, each of the two first T ports is coupled with all of the four P ports. The multiway switch is configured to be coupled with a radio frequency circuit of a wireless communication device through the ten T ports and an antenna system of the wireless communication device through the four P ports, to implement a preset function of the wireless communication device. The antenna system includes four antennas corresponding to the four P ports, and the preset function is a function of transmitting a sounding reference signal (SRS) through the four antennas in turn.

According to implementations of the present disclosure, a radio frequency system is provided. The radio frequency system includes an antenna system, a radio frequency circuit, and a multiway. The multiway switch includes ten T ports and four P ports, and the ten T ports include two first T ports, each of the two first T ports is coupled with all of the four P ports. The antenna system includes four antennas corresponding to the four P ports. The multiway switch is configured to be coupled with the radio frequency circuit through the ten T ports and the antenna system through the four P ports, to implement a preset function of the wireless communication device, and the preset function is a function of transmitting an SRS through the four antennas in turn.

According to implementations of the present disclosure, a wireless communication device is provided. The wireless communication device includes an antenna system, a radio frequency transceiver, a radio frequency circuit coupled with the radio frequency transceiver, and a multiway. The multiway switch includes ten T ports and four P ports, and the ten T ports include two first T ports, each of two first T ports is coupled with all of the four P ports. The antenna system including four antennas corresponding to the four P ports. The multiway switch is configured to be coupled with the radio frequency circuit through the ten T ports and the antenna system through the four P ports, to implement a preset function of the wireless communication device, and the preset function is a function of transmitting an SRS through the four antennas in turn.

Implementations of the present disclosure will be detailed below.

The wireless communication device involved in the implementations of the present disclosure may include various electronic devices, base stations, servers that have wireless communication functions. The electronic device includes any one of the following: a handheld device, an in-vehicle device, a wearable device (e.g., a smart bracelet, a smart watch, wearable glasses, a wireless headset, etc.), a wireless charging receiver, a computing device or other processing devices connected to a wireless modem, as well as various forms of user equipments (UE), mobile stations (MS), terminal devices, and the like. For the convenience of description, the above-mentioned devices are collectively referred to as electronic devices.

At present, a transmission function of sounding reference signal (SRS) switching in four antennas of a mobile phone is a mandatory option for China mobile communications corporation (CMCC) in the China mobile fifth generation (5G) Scale Test Technical White Paper_Terminal, which is optional in the 3rd generation partnership project (3GPP). Its main purpose is for a base station to determine quality and parameters of four channels via measuring uplink signals of the four antennas of the mobile phone, to perform a beamforming of a downlink massive multi-input multi-output (MIMO) antenna array on the four channels according to a channel reciprocity, and finally to obtain the best data transmission performance for a downlink 4×4 MIMO.

In order to satisfy transmission requirements of SRS switching in four antennas, implementations of the present disclosure provide a radio frequency architecture based on a simplified 4P10T antenna switch. Compared with an existing 3P3T/DPDT/multiway small switch switching scheme, the present switching scheme can reduce the number of series switches in each path (all or part of switches are integrated into a main switch of the 4PnT), thereby reducing link loss and optimizing the overall transmission and reception performance of a terminal. The implementations of the present disclosure are described in detail below.

Figure 2:
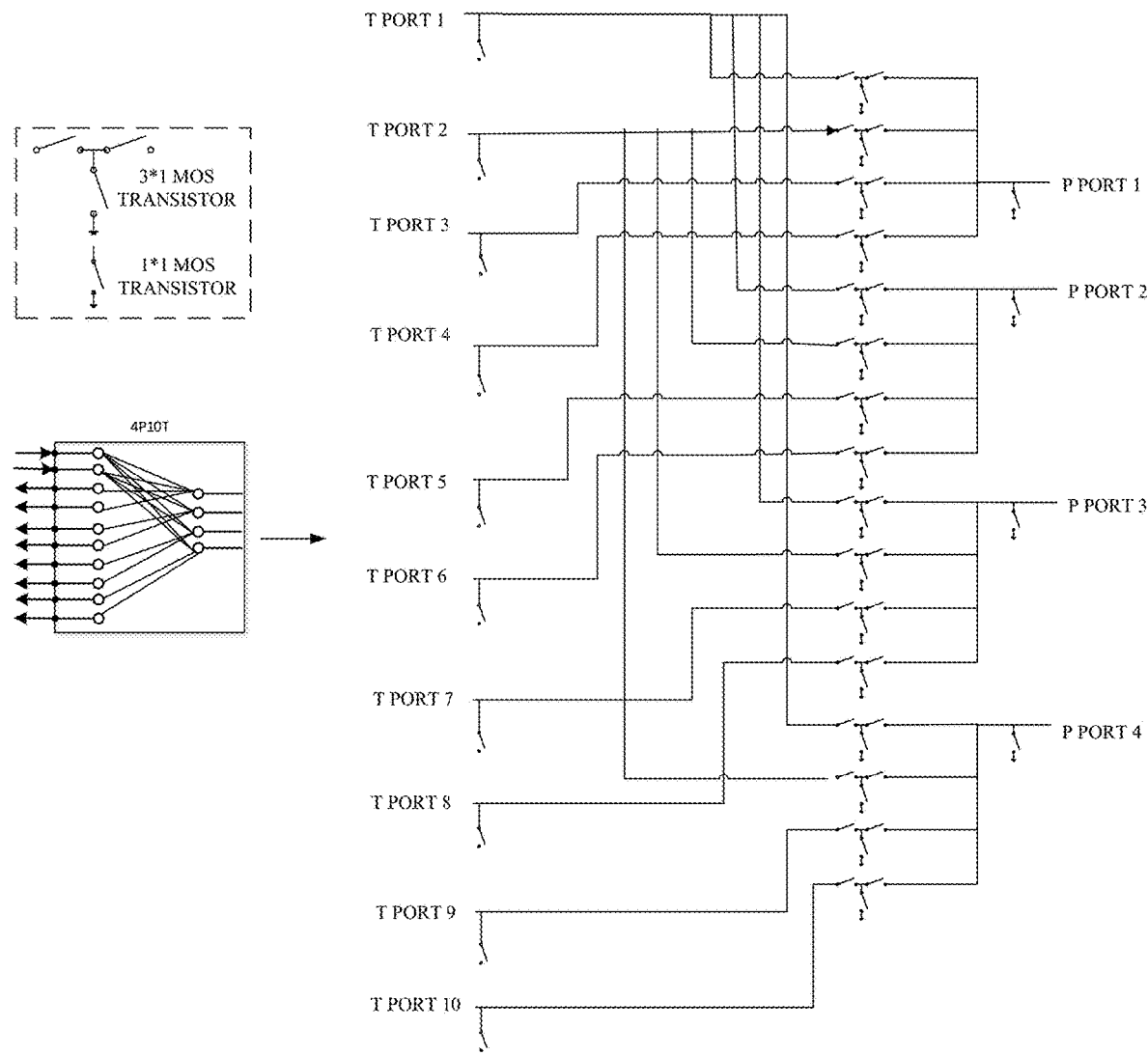
FIG. 2 is a schematic structural diagram illustrating a 4P10T full-coupling switch according to an implementation of the disclosure.

"P port" in the disclosure is the abbreviation of "pole port", which refers to ports coupled with antennas of the multiway switch. "T port" in the disclosure is the abbreviation of "throw port", which refers to ports coupled with radio frequency modules of the multiway switch. For example, the 4P10T switch refers to the switch that includes four P ports coupled with an antenna system, and ten T ports coupled with the radio frequency circuit. As illustrated in FIG. 2 for example, the ten T ports are T port 1, T port 2, . . . , T port 10. The four P ports are P port 1, P port 2, P port 3, and P port 4.

The concepts of coupling, full coupling, or other kinds of coupling between the T ports and the P ports of the multiway switch described in the implementations of the disclosure refer to a state that the T ports are coupled with the P ports through switch tubes, and the paths between the T ports and the P ports can be controlled to switch on through the switch tubes.

The expression of "transmitting an SRS through the four antennas corresponding to the four P ports in turn" refers to a process in which the wireless communication device interacts with a base station based on polling mechanism to determine quality of an uplink channel corresponding to each antenna.

FIG. 1 is a schematic structural diagram illustrating a multiway switch 10 according to an implementation of the disclosure. The multiway switch 10 is applicable to a wireless communication device 100. The wireless communication device 100 further includes an antenna system 20 and a radio frequency circuit 30. The antenna system 20 includes four antennas. The multiway switch 10 includes ten T ports and four P ports. The ten T ports are coupled with the radio frequency circuit 30, the four P ports are coupled with the antenna system 20. The four P ports correspond to the four antennas of the antenna system 20; specifically, the four P ports and the four antennas are in one-to-one correspondence. The ten T ports include two first T ports, each of the two first T ports is coupled with all of the four P ports (that is, fully-coupled).

The multiway switch 10 is configured to be coupled with the radio frequency circuit 30 and the antenna system 20 to implement a preset function of the wireless communication device 100. The preset function is a function of transmitting an SRS through the four antennas in turn, which can be understood as a four-port SRS function.

The wireless communication device 100 may be a mobile phone or other terminal devices supporting the fifth generation new radio (5G NR), such as a customer premise equipment (CPE) or a mobile wireless-fidelity (MIFI). The wireless communication device 100 may support dual-frequency dual-transmit operating mode. The dual-frequency dual-transmit operating mode refers to an operating mode in which the maximum capability of the wireless communication device 100 can support dual frequency band-two UL transmit paths or dual frequency band-four DL receive paths.

As the ten T ports includes two first T ports each of which is coupled with all of the four P ports, and other T ports only fixedly coupled with one antenna for receiving, the number of built-in field-effect transistors (FET), volume, and cost of the 4P10T switch can be reduced and performance can be improved. Details will be described hereinafter.

In one possible implementation, the ten T ports further include eight second T ports, each of the eight second T ports is coupled with one of the four P ports. T ports at the same frequency band in the eight second T ports are coupled with different P ports. The first T ports only support a transmission function, and the second T ports only support a reception function.

In this implementation, since the multiway switch 10 is composed of the first T ports and the second T ports, and the number of the second T ports is not 0, compared with a configuration in which all T ports are fully coupled with P ports, for the multiway switch 10 provided herein, the number of switches is reduced. That is, the number of the switches of transmit paths and/or receive paths of a radio frequency system of the wireless communication device can be reduced, thereby reducing path loss, improving transmit power/sensitivity, data transmission rate in the 5G NR, and uplink and downlink coverage of a mobile phone, and reducing power consumption and cost.

As illustrated in FIG. 2 of a schematic structural diagram of the multiway switch 10, the multiway switch 10 is composed of field-effect transistors. Among the ten T ports, as each of the two first T ports is coupled with all of the four P ports, the number of the field-effect transistors of the multiway switch 10 is $10+(2*4+(10-2)*1)*3+4=62$.

By limiting the number of T ports each of which is fully coupled with all of the four P ports (in other words, full-coupling T ports), the number of switches of the radio frequency system of the wireless communication device 100 can be effectively reduced. That is to say, the number of full-coupling T ports has a great influence on performance of the radio frequency system.

Figure 3:
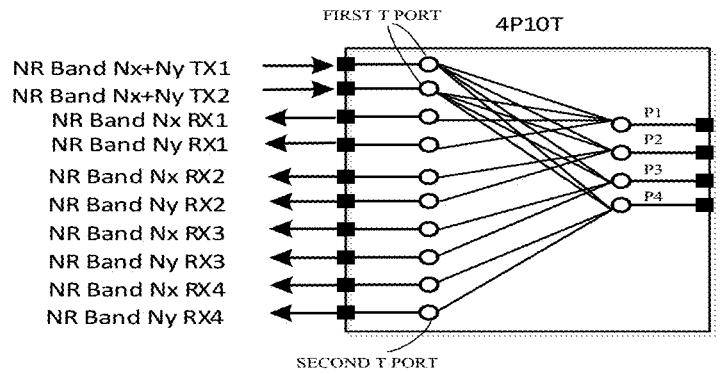
FIG. 3 is a schematic structural diagram illustrating a 4P10T simplified switch according to an implementation of the disclosure.

FIG. 3 is a schematic structure of a multiway switch corresponding to the structure illustrated in FIG. 2 according to an implementation of the disclosure. As illustrated in FIG. 3, the multiway switch 4P10T includes ten T ports and four P ports. The ten T ports include two first T ports that are marked TX ports (the TX port refers to the port that supports the signal transmission function), and eight second T ports that are marked as RX ports (the RX port refers to the port that only supports the signal reception function). The P ports (marked as P1, P2, P3, and P4) are coupled with the ports (coupled with corresponding antennas) of the antenna system 20.

As can be seen, the multiway switch provided in the implementations of the disclosure, is applicable to the wireless communication device which supports dual-frequency dual-transmit operating mode. The wireless communication device includes the antenna system, the radio frequency circuit, and the multiway switch. The antenna system includes the four antennas, and the multiway switch includes the ten T ports and the four P ports. The multiway switch is configured to be coupled with the radio frequency circuit and the antenna system to implement the preset function of the wireless communication device, the preset function relates to transmitting an SRS through the four antennas corresponding to the four P ports in turn, such as based on a polling mechanism, and can be comprehended as a four-port SRS.

In one possible implementation, the radio frequency circuit 30 of the wireless communication 100 includes four transmitter circuits and eight receiver circuits.

In one possible implementation, the radio frequency circuit 30 of the wireless communication device 100 is formed by a plurality of independent circuit modules, and includes two transmitter integrated circuits and eight receiver circuits. Each independent circuit module includes at least one of the transmitter integrated circuit and the receiver circuit. Each transmitter integrated circuit includes two transmitter circuits being operable at different frequency bands and a transmit port. The transmit ports of the two transmitter integrated circuits are coupled with the first T ports of the multiway switch one-to-one. Each receiver circuit comprises a receive port, and the receive ports of the eight receiver circuits are coupled with the second T ports of the multiway switch one-to-one.

In one possible implementation, the radio frequency circuit 30 is formed by two independent circuit modules. The two independent circuit modules include two first independent circuit modules, and each of the first independent circuit module includes one first port and four second ports. The first ports of the two first independent circuit modules are coupled with the first T ports of the multiway switch one-to-one, and the second ports are coupled with the second T ports one-to-one. That is, the first ports of the two independent circuit modules and the first T ports of the multiway switch are in one-to-one correspondence, and the second ports of the two independent circuit modules and the second T ports of the multiway switch are in one-to-one correspondence. In the disclosure, the first port is a transmit port, and the second port is a receive port. The "transmit port" refers to a port (may be composed of one or more components) which implements a corresponding transmission function and is located on the path of a transmitter circuit, or on the path after integration of one or more transmitter circuits. The "receive port" refers to a port (may be composed of one or more components) which implements a corresponding reception function and is located on the path of a receiver circuit, or on the path after integration of one or more receiver circuits. It should be noted that the ports such as transmit ports, and receive ports illustrated in the figures are exemplary and do not intent to indicate an exact port position and impose any restrictions.

Specifically, since low-noise amplifiers (LNA) in the receiver circuit can operate simultaneously, due to their low power and low power consumption, mutual influence can be avoided through design. Therefore, multiple LNAs in multiple receiver circuits at the same frequency band can exist in the same circuit module. However, when two power amplifiers (PA) at the same frequency band work simultaneously (corresponding to UL MIMO mode), a transmit power will be high, and two signals will interfere with each other. In addition, the two PAs will affect heat dissipation efficiency when working at the same time. There are four transmitter circuits in the implementation of the disclosure, thus two PAs at the same frequency band can exist, while the two PAs at the same frequency band cannot be arranged in the same circuit module. Therefore, at least two independent circuit modules are required.

Figure 4:
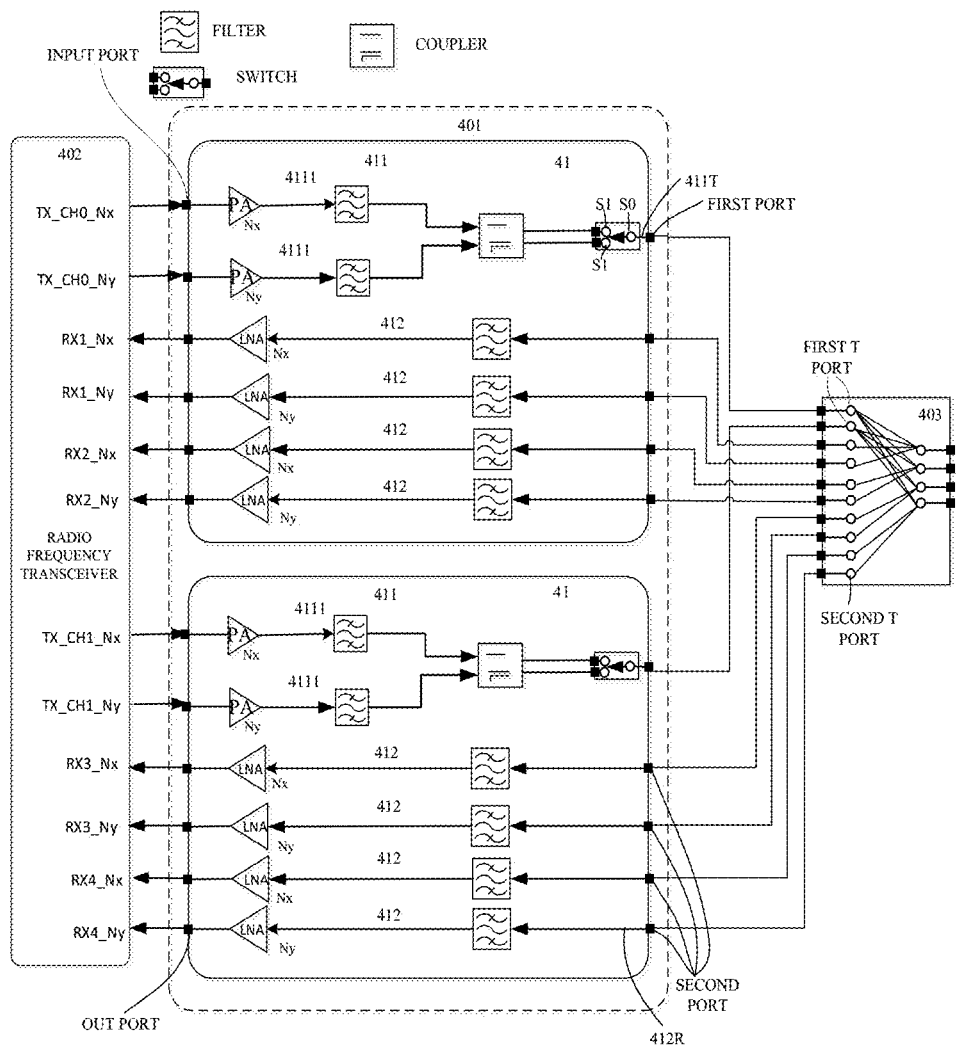
FIG. 4 is a schematic structural diagram illustrating a radio frequency system of a wireless communication device according to an implementation of the disclosure.

When the radio frequency circuit 30 is formed by two independent circuit modules, an example structure of the corresponding wireless communication device 100 can be referred to FIG. 4.

FIG. 4 is a schematic structural diagram illustrating a radio frequency system of the wireless communication device according to an implementation of the disclosure. As illustrated in FIG. 4, when the radio frequency circuit 401 is formed by two first independent circuit modules 41, each of the first independent circuit 41 modules includes a transmitter integrated circuit 411, four receiver circuits 412, one first port, and four second ports. The transmitter integrated circuit 411 includes two transmitter circuits 4111 being operable at different frequency bands, and a transmit port 411T coupled with the first port of the first independent circuit module 41 to which the transmitter integrated circuit 411 belongs. The four receiver circuits 412 include four receive ports 412R coupled with the four second ports of the first independent circuit module 41 one-to-one, that is, the receive ports 412R and the second ports of the first independent circuit module 41 are in one-to-one correspondence.

It can be understood that, the matching manner of the above radio frequency circuit 401 and the multiway switch includes but is not limited to the structure of the drawing, and is merely an example herein.

In addition, the wireless communication device further includes a radio frequency transceiver 402. The radio frequency transceiver 402 is coupled with the radio frequency circuit 401 and constitutes a radio frequency system of the wireless communication device together with the radio frequency circuit 401, the multiway switch 403, and the antenna system.

Each of the four receiver circuits 412 may include an LNA and a filter, where the filter has an input port coupled with a corresponding second port of the first independent circuit module 41, and an output port coupled with an input port of the LNA. The LNA has an output port coupled with a corresponding port of the radio frequency transceiver 402.

Each of the transmitter integrated circuit 411 include two PAs, two filters, a coupler and a switch. The PA has an input port coupled with a corresponding port of the radio frequency transceiver 402, and an output port coupled with the input port of the filter. The coupler has two input ports respectively coupled with the output ports of the two filters, and two out ports coupled with two selection ports S1 of the switch one-to-one. The switch has a common port S0 coupled with the first port of the first independent circuit module 41.

In one of the first independent circuit modules 41, the switch of the transmitter integrated circuit 411 is coupled with one first T port of the multiway switch 403. The two PAs of the transmitter integrated circuit 411 are coupled with a pin TX_CH0_Nx (a transmit port of a first transmit path at Nx frequency band) and a pin TX-CH0-Ny (a transmit port of the first transmit path at Ny frequency band) of the radio frequency transceiver 402 one-to-one. The filters of the four receiver circuits 412 are coupled with four T ports of the multiway switch 10 one-to-one, and the LNAs of the four receiver circuits 412 are coupled with four pins RX1_Nx (the first receive port of the Nx frequency band), RX1_Ny (the first receive port of the Ny frequency band), RX2_Nx (the second receive port of the Nx frequency band), and RX2_Ny (the second receive port of the Ny frequency band) of the radio frequency transceiver 402 one-to-one.

In the other one of the first independent circuit modules 41, the switch of the transmitter integrated circuit 411 is coupled with the other one first T port of the multiway switch 403. The two PAs of the transmitter integrated circuit 411 are coupled with a pin TX_CH1_Nx (the transmit port of the first transmit path at Nx frequency band) and a pin TX-CH1-Ny (the transmit port of the first transmit path at Ny frequency band) of the radio frequency transceiver 402 one-to-one. The filters of the four receiver circuits 412 are coupled with the other four T ports of the multiway switch 10 one-to-one, and the LNAs of the four receiver circuits 412 are coupled with four pins RX3_Nx (the third receive port of the Nx frequency band), RX3_Ny (the third receive port of the Ny frequency band), RX4_Nx (the fourth receive port of the Nx frequency band), and RX4_Ny (the fourth receive port of the Ny frequency band) of the radio frequency transceiver 402 one-to-one.

The wireless communication device can control the connection state of the T ports and the P ports of the multiway switch 10 through the switch tube, to implement a preset function of the wireless communication device 100. The preset function is a function of transmitting an SRS through the four antennas in turn, which can be understood as a four-port SRS function.

In one possible implementation, the radio frequency circuit 30 is formed by three independent circuit modules.

Figure 5A:
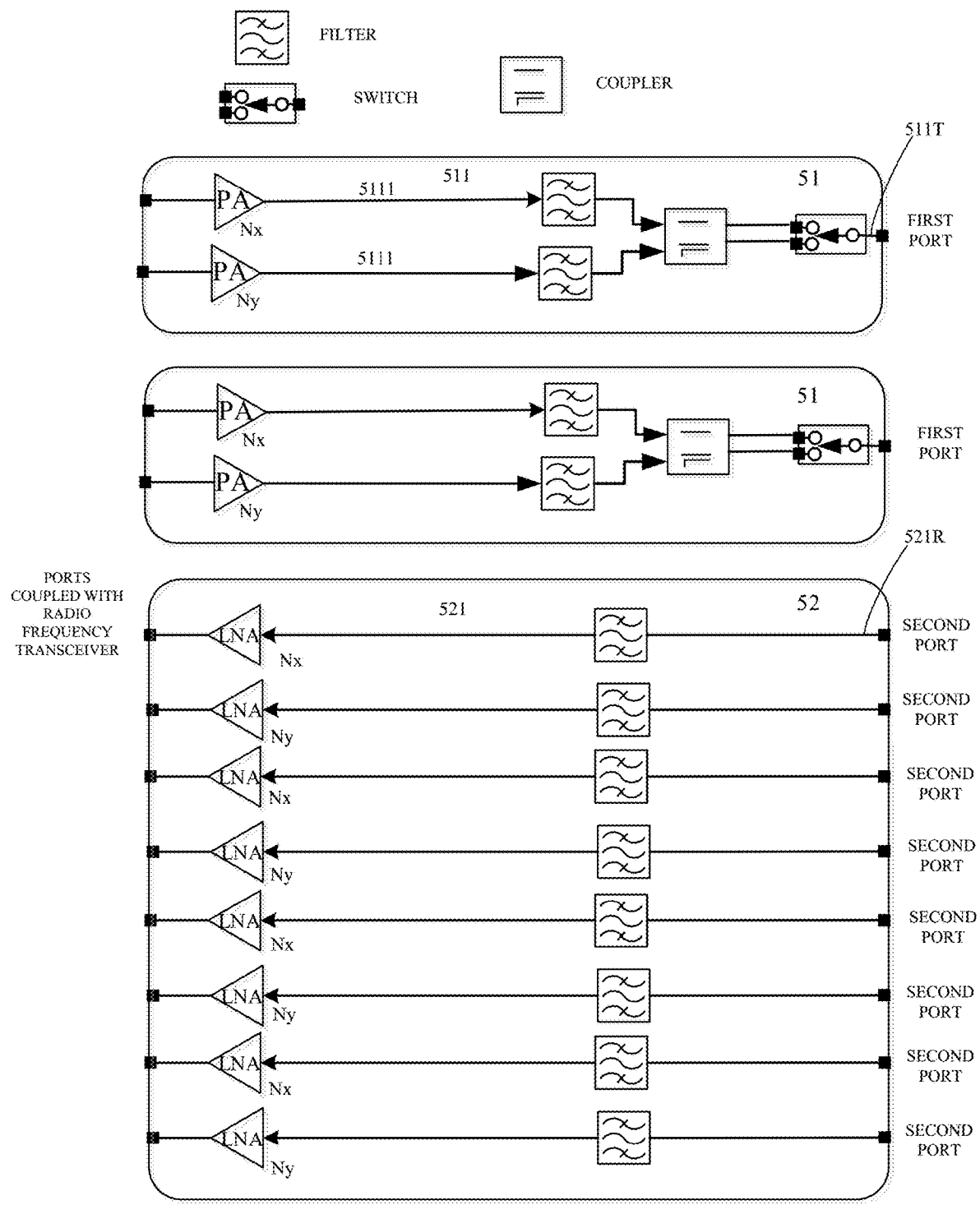
FIG. 5A is a schematic structural diagram illustrating a radio frequency circuit of a wireless communication device according to an implementation of the disclosure.
Figure 5B:
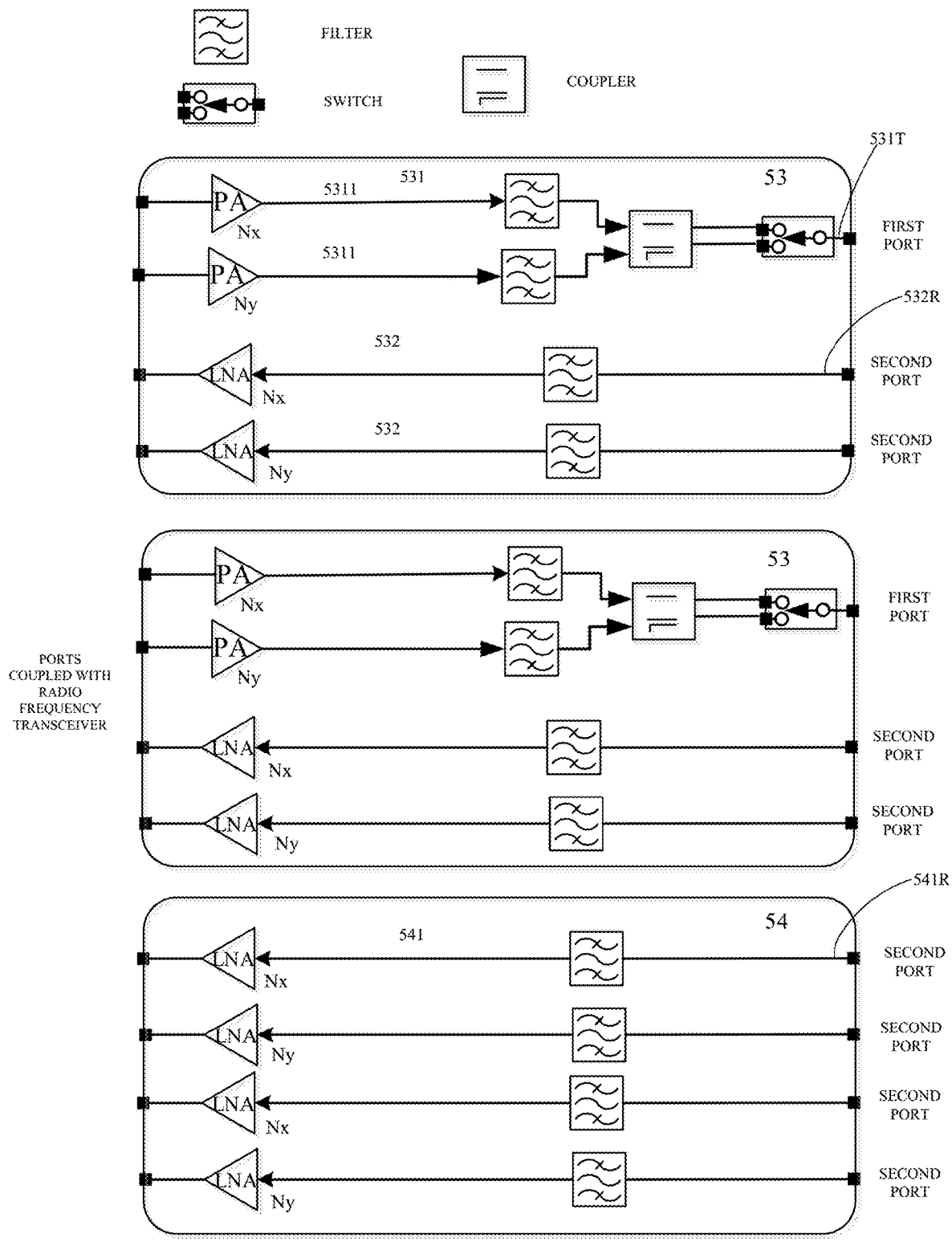
FIG. 5B is a schematic structural diagram illustrating another radio frequency circuit of a wireless communication device according to an implementation of the disclosure.

Specifically, when the radio frequency circuit 30 is formed by three independent circuit modules, an example structure of the corresponding wireless communication device 100 can be referred to FIG. 5A or FIG. 5B.

As illustrated in FIG. 5A, when the radio frequency circuit 30 is formed by three independent circuit modules, the three independent circuit modules include two second independent circuit modules 51 and one third independent circuit module 52.

Each second independent circuit module 51 includes one first port, the third independent circuit module 52 includes eight second ports. The first ports of the two second independent circuit modules 51 are coupled with the first T ports of the multiway switch one-to-one, and the eight second ports are coupled with the second T ports of the multiway switch one-to-one.

The second independent circuit module 51 further includes a transmitter integrated circuit 511. The transmitter integrated circuit 511 includes two transmitter circuits 5111 being operable at different frequency bands, and a transmit port 511T coupled with the first port of the second independent circuit module 51. The third independent circuit module 52 further includes eight receiver circuits 521 each having a receive port 521R. The receive ports 521R of the eight receiver circuits 521 are coupled with the eight second ports of the third independent circuit module 52 one-to-one.

As illustrated in FIG. 5B, when the radio frequency circuit 30 is formed by three independent circuit modules, the three independent circuit modules include two second independent circuit modules 53 and one third independent circuit module 54.

Each of the second independent circuit module 53 includes one first port and two second ports, the third independent circuit module 54 includes four second ports. The first ports of the two second independent circuit modules 53 are coupled with the first T ports of the multiway switch one-to-one, and the second ports of the two second independent circuit modules 53 and the third independent circuit module 54 are coupled with the second T ports of the multiway switch one-to-one.

The second independent circuit module 53 further includes a transmitter integrated circuit 531 and two receiver circuits 532 each having a receive port 532R. The transmitter integrated circuit 531 includes two transmitter circuits 5311 being operable at different frequency bands, and a transmit port 531T coupled with the first port of the second independent circuit module 53. The receive ports 532R of the two receiver circuits 532 are coupled with the two second ports of the second independent circuit module 53 one-to-one. The third independent circuit module 54 further includes four receiver circuits 541 each having a receive port 541R. The receive ports 541R of the four receiver circuits 541 are coupled with the four second ports of the third independent circuit module 54 one-to-one.

Figure 6:
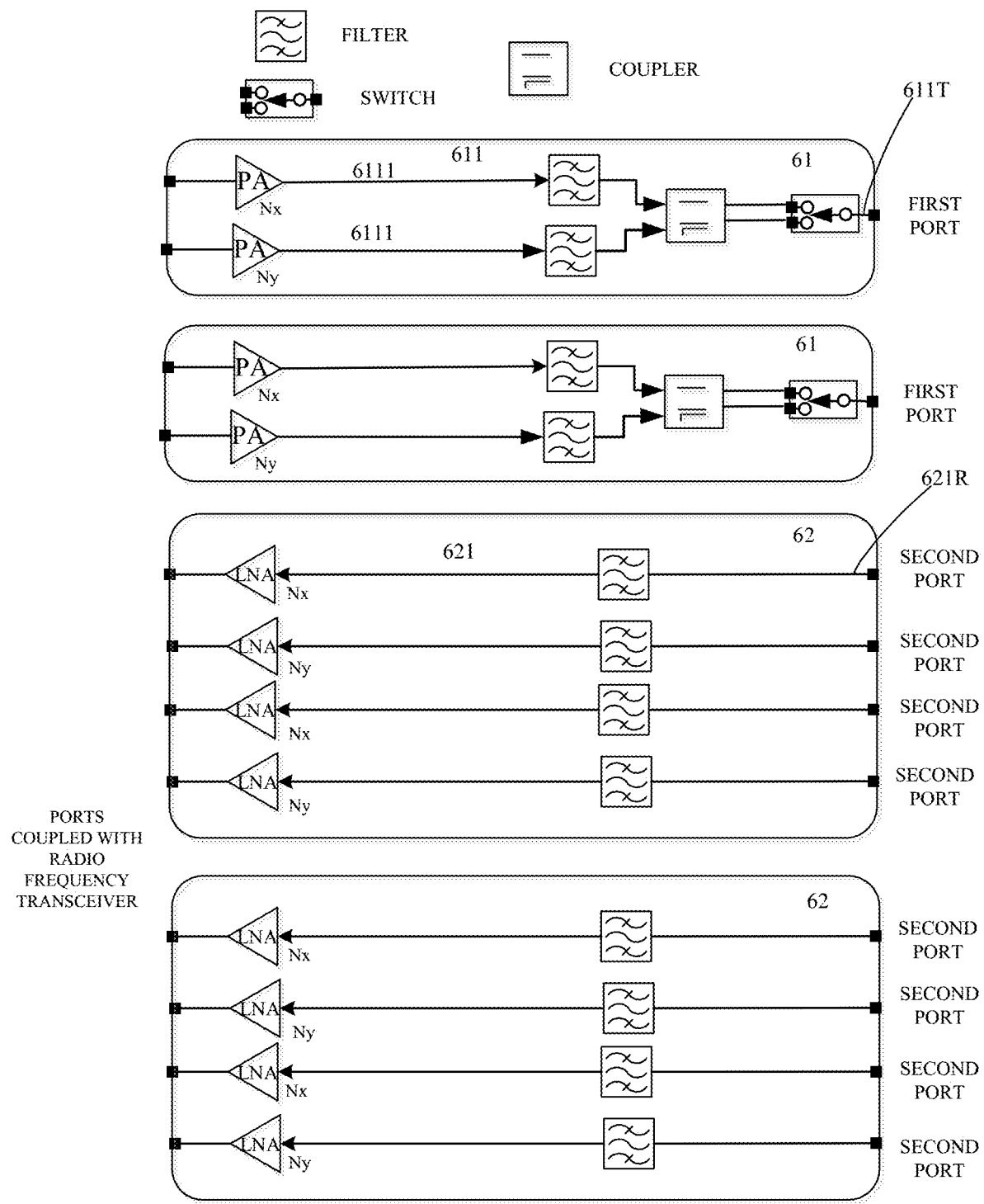
FIG. 6 is a schematic structural diagram illustrating yet another radio frequency circuit of a wireless communication according to an implementation of the disclosure.

In one possible implementation, the radio frequency circuit 30 is formed by four independent circuit modules. As illustrated in FIG. 6, the four independent circuit modules include two fourth independent circuit modules 61 and two fifth independent circuit modules 62. Each of the fourth independent circuit modules 61 includes one first port, the fifth independent circuit module 62 includes four second ports. The first ports of the two fourth independent circuit modules 61 are coupled with the first T ports of the multiway switch one-to-one, and the second ports of the two fifth independent circuit modules 62 are coupled with the second T ports of the multiway switch one-to-one.

The fourth independent circuit module 61 further includes a transmitter integrated circuit 611. The transmitter integrated circuit 611 includes two transmitter circuits 6111 being operable at different frequency bands, and a transmit port 611T coupled with the first port of the fourth independent circuit module 61.

The fifth independent circuit module 62 further includes four receiver circuits 621 each having a receive port 621R. The receive ports 621R of the four receiver circuits 621 are coupled with the four second ports of the fifth independent circuit module 62 one-to-one.

Figure 7:
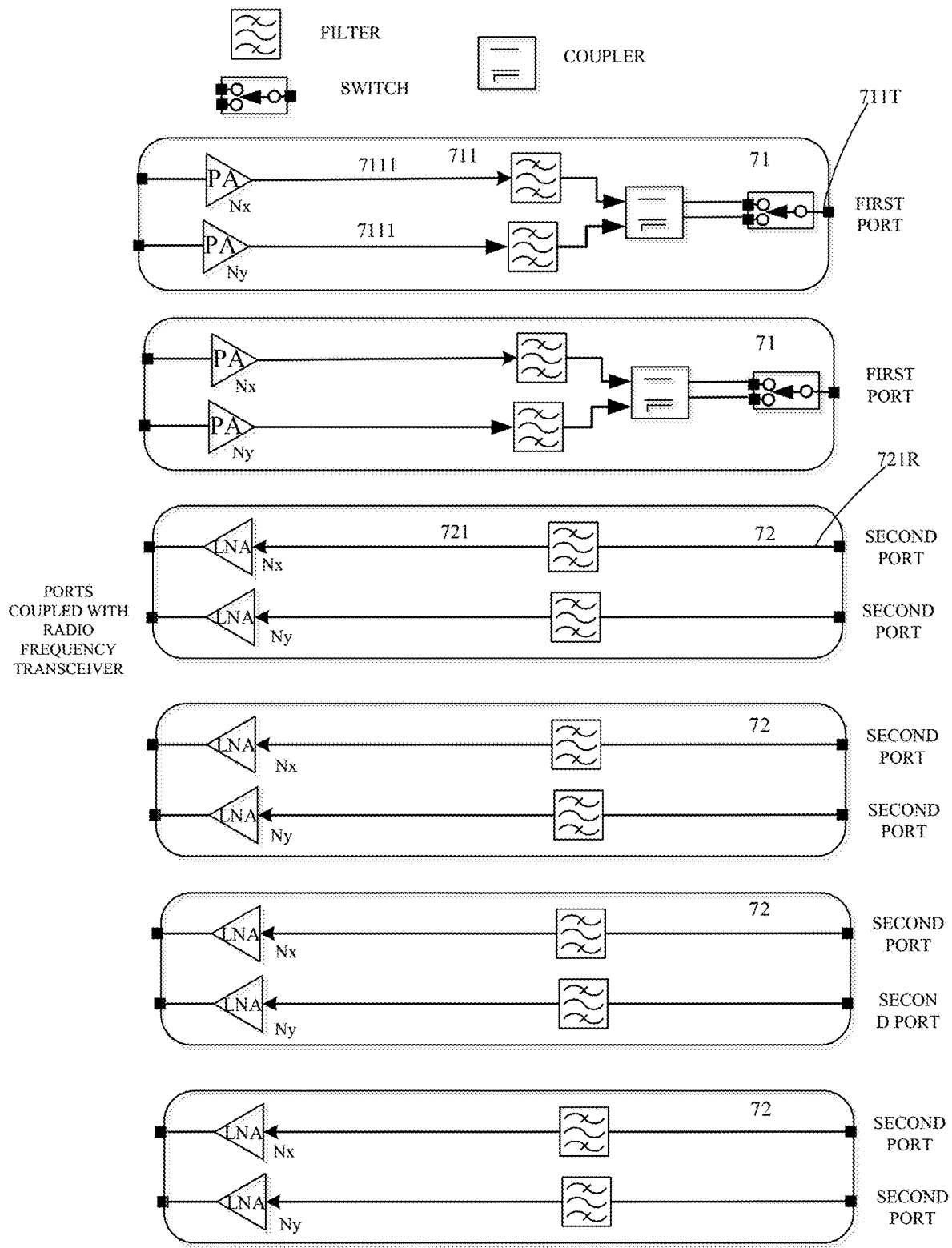
FIG. 7 is a schematic structural diagram illustrating still another radio frequency circuit of a wireless communication device according to an implementation of the disclosure.

In one possible implementation, the radio frequency circuit 30 is formed by six independent circuit modules. As illustrated in FIG. 7, the six independent circuit modules include two sixth independent circuit modules 71 and four seventh independent circuit modules 72. Each of the sixth independent circuit modules 71 includes one first port, the seventh independent circuit module 72 includes two second ports. The first ports of the two sixth independent circuit modules 71 are coupled with the first T ports of the multiway switch one-to-one, and the second ports of the four seventh independent circuit modules 72 are coupled with the second T ports of the multiway switch one-to-one.

The sixth independent circuit module 71 further includes a transmitter integrated circuit 711. The transmitter integrated circuit 711 includes two transmitter circuits 7111 being operable at different frequency bands, and a transmit port 711T coupled with the first port of the sixth independent circuit module 71.

The seventh independent circuit module 72 further includes two receiver circuits 721 each having a receive port 721R. The receive ports 721R of the two receiver circuits 721 are coupled with the two second ports of the seventh independent circuit module 72 one-to-one.

Figure 8:
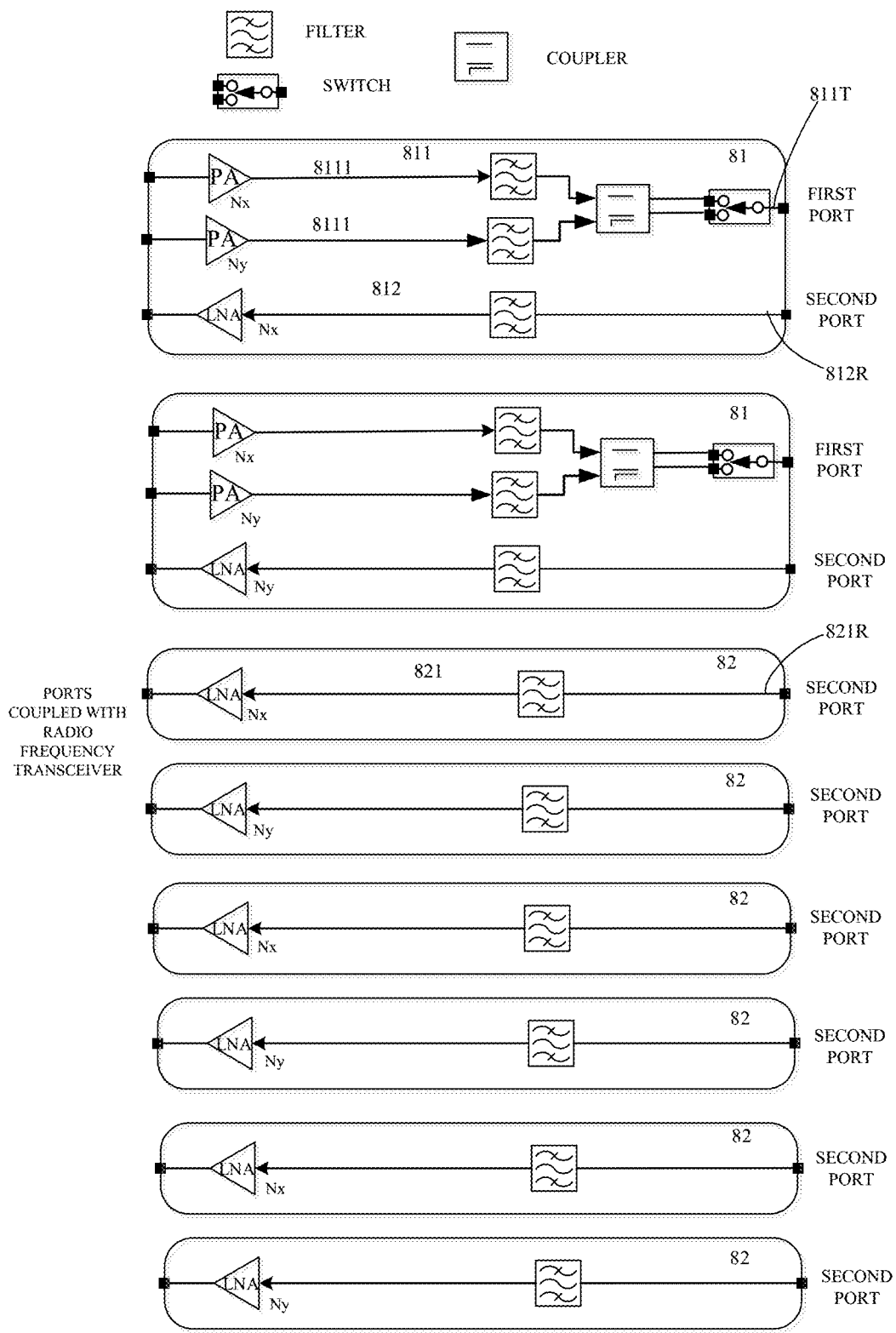
FIG. 8 is a schematic structural diagram illustrating still another radio frequency circuit of a wireless communication device according to an implementation of the disclosure.

In one possible implementation, the radio frequency circuit 30 is formed by eight independent circuit modules. As illustrated in FIG. 8, the eight independent circuit modules include two eighth independent circuit modules 81 and six ninth independent circuit modules 82. Each of the eighth independent circuit modules 81 includes one first port and one second port, the ninth independent circuit module 82 includes one second port. The first ports of the two eighth independent circuit modules 81 are coupled with the first T ports of the multiway switch one-to-one, and the second ports of the two eighth independent circuit modules 81 and the six ninth independent circuit modules 82 are coupled with the second T ports of the multiway switch one-to-one.

The eighth independent circuit module 81 further includes a transmitter integrated circuit 811 and a receiver circuit 812. The transmitter integrated circuit 811 includes two transmitter circuits 8111 being operable at different frequency bands, and a transmit port 811T coupled with the first port of the eighth independent circuit module 81. The receiver circuit 821 has a receive port 812R coupled with the second port of the eighth independent circuit module 81.

The ninth independent circuit module 82 further includes one receiver circuit 821 having a receive port 821R. The receive port 821R of the receiver circuit 821 is coupled with the second port of the ninth independent circuit module 82.

Figure 9:
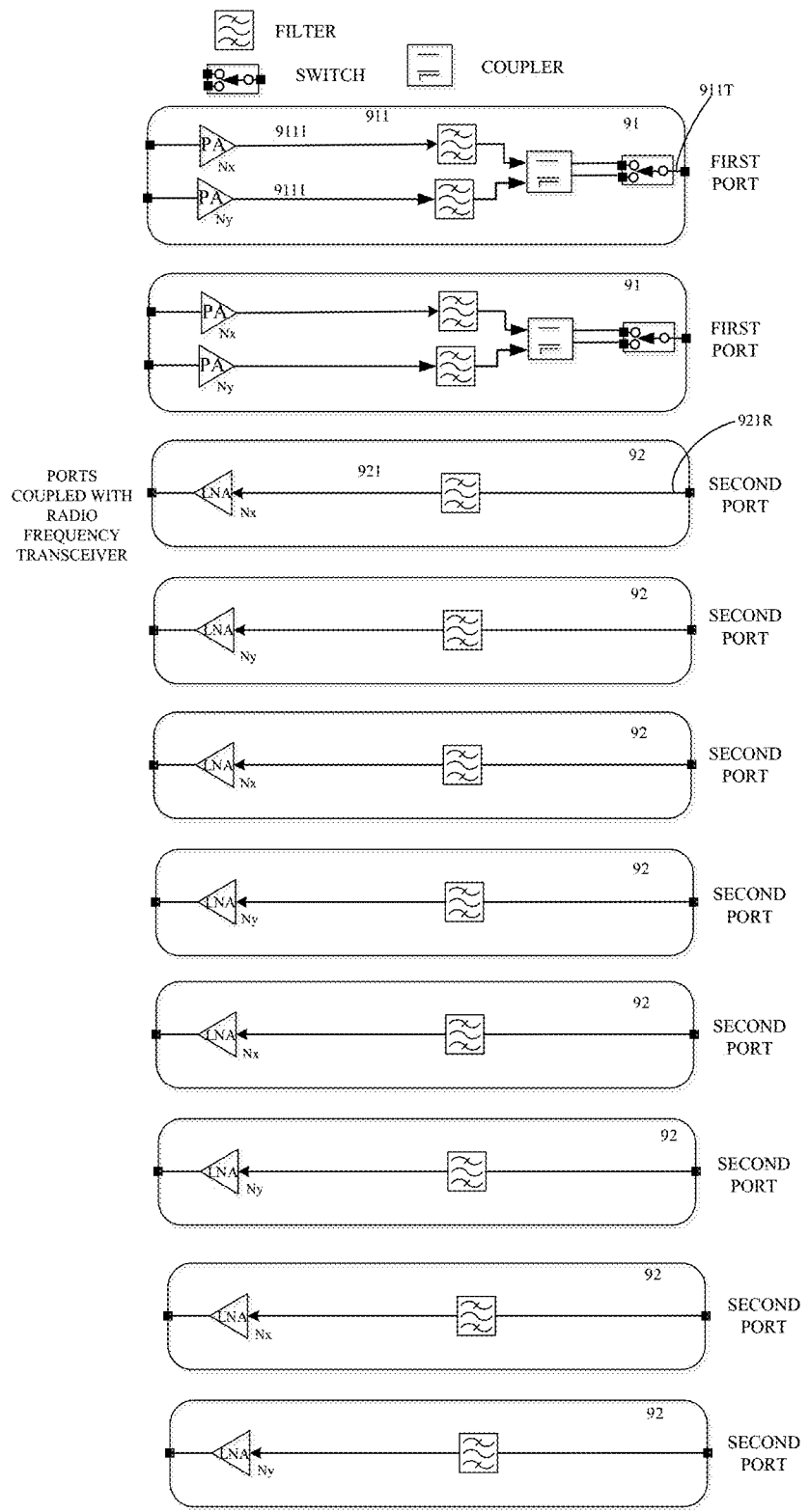
FIG. 9 is a schematic structural diagram illustrating still another radio frequency circuit of a wireless communication device according to an implementation of the disclosure.

In one possible implementation, the radio frequency circuit 30 is formed by ten independent circuit modules. As illustrated in FIG. 9, the ten independent circuit modules include two tenth independent circuit modules 91 and eight eleventh independent circuit modules 92. Each of the tenth independent circuit modules 91 includes one first port, the eleventh independent circuit module 92 includes one second port. The first ports of the two tenth independent circuit modules 91 are coupled with the first T ports of the multiway switch one-to-one, and the second ports of the eight eleventh independent circuit modules 92 are coupled with the second T ports of the multiway switch one-to-one.

The tenth independent circuit module 91 further includes a transmitter integrated circuit 911. The transmitter integrated circuit 911 includes two transmitter circuits 9111 being operable at different frequency bands, and a transmit port 911T coupled with the first port of the tenth independent circuit module 91.

The eleventh independent circuit module 92 further includes one receiver circuit 921 having a receive port 921R. The receive port 921R of the receiver circuit 921 is coupled with the second port of the eleventh independent circuit module 92.

Connection relationships among the radio frequency transceiver, the radio frequency circuit 30, and the multiway switch 10 illustrated in FIG. 5A to FIG. 9 are similar to those illustrated in FIG. 4 and will not be detailed again herein.

Figure 10:
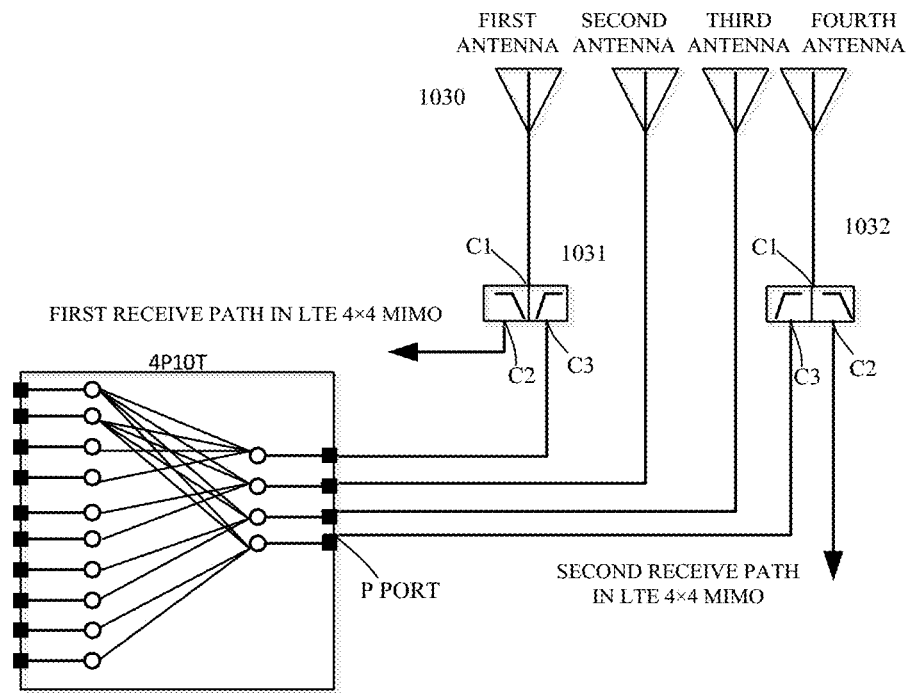
FIG. 10 is a schematic structural diagram illustrating an antenna system of a wireless communication device according to an implementation of the disclosure.

In one possible implementation, as illustrated in FIG. 10, the four antennas of the antenna system include a first antenna, a second antenna, a third antenna, and a fourth antenna. The first antenna and the fourth antenna are antennas operable at a long term evolution (LTE) frequency band and a 5G NR frequency band. The second antenna and the third antenna are antennas only operable at the 5G NR frequency band.

The 5G NR frequency band may include, for example, 3.3 GHz to 3.8 GHz, and 4.4 GHz to 5 GHz.

The first antenna and fourth antenna are intended to support DL 4×4 MIMO at some frequency bands in LTE on terminals. These two antennas are shared with the 5G NR (hereinafter, "shared antennas" for short). The LTE frequency band may include, for example, 1880-1920 MHz and 2496-2690 MHz.

In one possible implementation, the four antennas are antennas operable at a fifth generation new radio (5G NR) frequency band.

Since LNAs in the receiver circuit can operate simultaneously, due to their low power and low power consumption, mutual influence can be avoided through design. Therefore, multiple LNAs in multiple receiver circuits at the same frequency band can exist in the same circuit module. However, in this example, when two PAs at the same frequency band work simultaneously (corresponding to UL MIMO mode), a transmit power will be high, and two signals will interfere with each other. In addition, the two PAs will affect heat dissipation efficiency when working at the same time. Considering this, at least two independent circuit modules are needed to set the PAs in the transmitter circuits, which is beneficial to reducing interference and improving signal processing efficiency and heat dissipation efficiency of the radio frequency system.

In one possible implementation, as illustrated in FIG. 10, the antenna system 1030 further includes a first combiner 1031 and a second combiner 1032. The first combiner 1031 has a first port C1 coupled with the first antenna, a second port C2 coupled with a first receive path in LTE 4×4 multiple-input multiple-output (MIMO) configuration of the wireless communication device, and a third port C3 coupled with a corresponding P port of the multiway switch. The second combiner 1032 has a first port C1 coupled with the fourth antenna, a second port C2 coupled with a second receive path in the LTE 4×4 MIMO configuration of the wireless communication device, and a third port C3 coupled with a corresponding P port of the multiway switch.

The LTE 4*4 MIMO is a downlink LTE receive circuit and can be defined as a third receive path. Since the LTE currently has two receive paths, in order to support LTE 4×4 MIMO, a third path and a fourth receive path are added.

According to performance of the four antennas, the wireless communication device 100 will arrange one antenna with better performance for the circuit for PRX (primary receiver), and the antenna will be in a standby state. Moreover, the first T ports in the multiway switch having both the transmission function and the reception function can be configured for TX (transmit) and PRX purpose, and thus the antenna can be switched arbitrarily. In this way, there is no need to restrict the coupling between ports of shared antennas.

Figure 11:
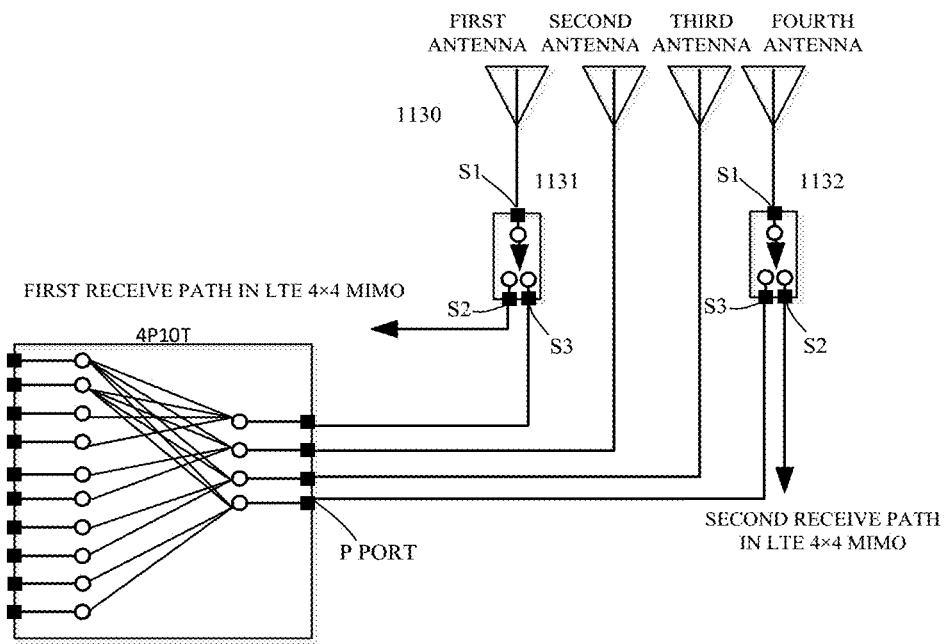
FIG. 11 is a schematic structural diagram illustrating another antenna system of a wireless communication device according to an implementation of the disclosure.

In one possible implementation, as illustrated in FIG. 11, the antenna system 1130 further includes a first single-pole double-throw (SPDT) switch 1131 and a second SPDT switch 1132. The first SPDT switch 1131 has a first port 51 coupled with the first antenna, a second port S2 coupled with a first receive path in LTE 4×4 MIMO configuration of the wireless communication device, and a third port S3 coupled with a corresponding P port of the multiway switch. The second SPDT switch 1132 has a first port 51 coupled with the fourth antenna, a second port S2 coupled with a second receive path in the LTE 4×4 MIMO configuration of the wireless communication device, and a third port S3 coupled with a corresponding P port of the multiway switch.

Figure 12:
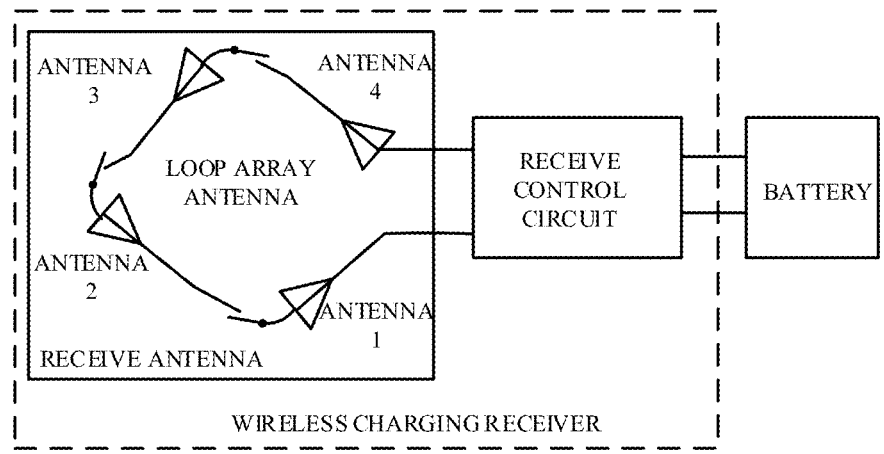
FIG. 12 is a schematic diagram illustrating a wireless charging receiver for an antenna of a wireless communication device according to an implementation of the disclosure.

In addition, as illustrated in FIG. 12, the four antennas in the antenna system described in the implementations of the disclosure can also be multiplexed by a wireless charging receiver of the wireless communication device. The wireless charging receiver includes a receive antenna and a receive control circuit. The receive antenna matches transmit antennas of the wireless charging transmitter (resonates at the same or similar frequency and transfers energy in a wireless manner in the way of radiative resonant magnetic coupling). The receive control circuit converts, through a loop array antenna, the energy into a direct current (DC) to output to charge a battery. The receive control circuit can dynamically adjust a frequency of the loop array antenna and match the frequency of the loop array antenna with frequencies of the transmit antennas of the wireless charging transmitter to achieve paired charging. Alternatively, the receive control circuit interacts with the wireless charging transmitter in real time on a frequency change range to implement an 3 wireless charging mode.

The receive antenna may be an antenna include at least one of the four antennas (in the case of multiple antennas, the multiple antennas are strobed via switches).

Figure 13:
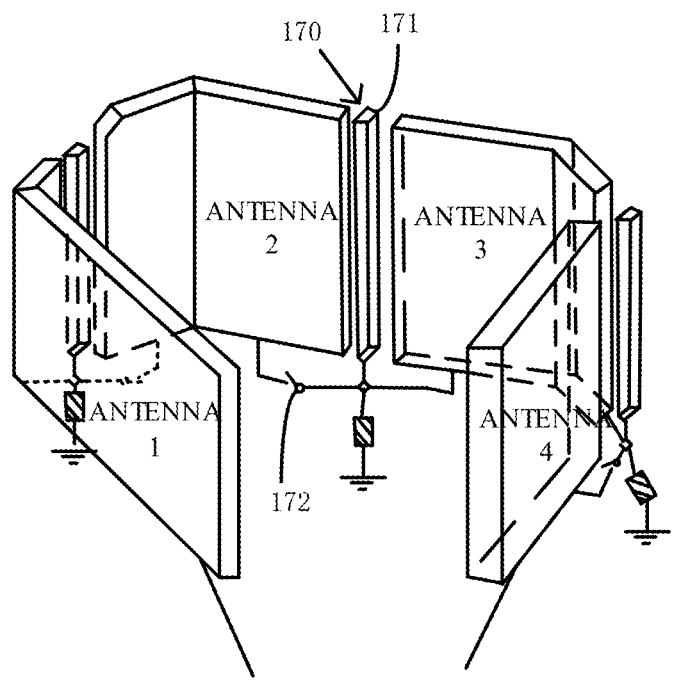
FIG. 13 is a schematic structural diagram illustrating a loop array antenna including four antennas according to an implementation of the disclosure.

For example, as illustrated in FIG. 13, the receive antenna is a loop array antenna including the four antennas described above. The four antennas include antenna 1, antenna 2, antenna 3, and antenna 4. Antenna 1 and antenna 4 are operable at both an LTE frequency band and a 5G NR frequency band, while antenna 2 and antenna 3 are only operable at the 5G NR frequency band. A port of antenna 1 and a port of antenna 4 are used as ports of the loop array antenna. Adjacent antennas are coupled via a gate circuit 170 with an isolation function. The gate circuit 170 includes a spacer 171 and a switch 172, where the spacer 171 is a conductor and the switch 172 is further coupled with a controller. The wireless communication device can conduct the switch 172 of each gate circuit 170 in a wireless charging mode to form a loop array antenna to receive energy. By adding the spacers 171 among the antennas, the gate circuit 170 can reduce mutual coupling among the multiple antennas of the wireless communication device in a normal communication mode, improve isolation among the multiple antennas, and optimize performance of the antennas. On the other hand, the multiple antennas can be coupled in series to form the loop array antenna through the switches 172, so as to better match the transmit antennas to transfer energy. Furthermore, since the capabilities of antenna 1 and antenna 4 are stronger than those of antenna 2 and antenna 3, the loop array antenna thus arranged can reduce energy loss in transmission as much as possible.

Figure 14:
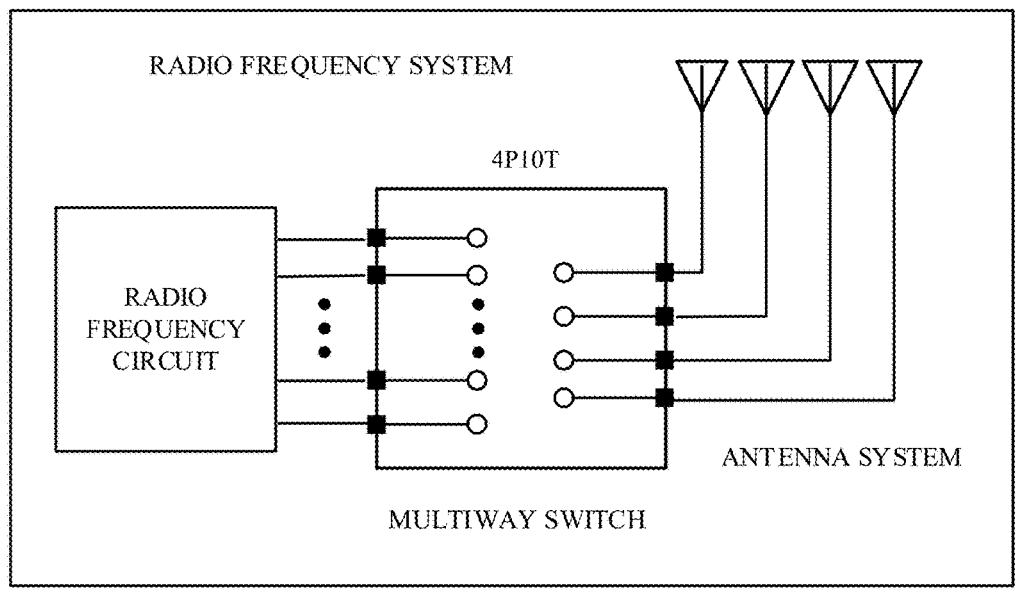
FIG. 14 is a schematic structural diagram illustrating a radio frequency system according to an implementation of the disclosure.

FIG. 14 is a schematic structural diagram illustrating a radio frequency system according to an implementation of the disclosure. The radio frequency system includes an antenna system, a radio frequency circuit, and the multiway switch according to any of the implementations above.

The multiway switch includes ten T ports and four P ports, and the ten T ports include two first T ports each of which is coupled with all of the four P ports. The antenna system includes four antennas corresponding to the four P ports.

The multiway switch is configured to be coupled with the radio frequency circuit through the ten T ports and the antenna system through the four P ports, to implement a preset function of a wireless communication device, and the preset function being a function of transmitting an SRS through the four antennas in turn. The 4P10T configuration of the multiway switch can refer to the foregoing descriptions and will not be detailed again herein.

Figure 15:
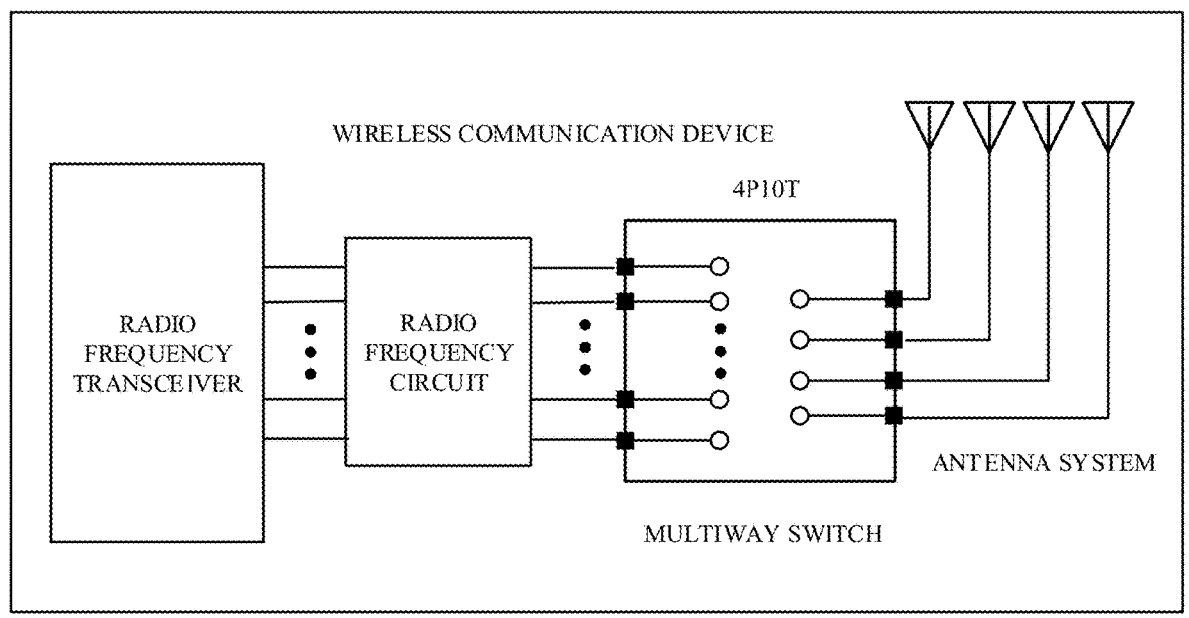
FIG. 15 is a schematic structural diagram illustrating a wireless communication device according to an implementation of the disclosure.

FIG. 15 is a schematic structural diagram illustrating a wireless communication device according to an implementation of the disclosure. The wireless communication device for example can be a mobile terminal, a base station, a server, and the like, and includes an antenna system, a radio frequency transceiver, a radio frequency circuit coupled with the radio frequency transceiver, and a multiway switch described in any of the implementations above.

The multiway switch includes ten T ports and four P ports, and the ten T ports include two first T ports each of which is coupled with all of the four P ports. The antenna system includes four antennas corresponding to the four P ports.

The multiway switch is configured to be coupled with the radio frequency circuit through the ten T ports and the antenna system through the four P ports, to implement a preset function of a wireless communication device, and the preset function being a function of transmitting an SRS through the four antennas in turn. The 4P10T configuration of the multiway switch can refer to the foregoing descriptions and will not be detailed again herein.

While the disclosure has been described in connection with certain implementations, it is to be pointed out that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multiway switch, comprising:
    ten throw (T) ports and four pole (P) ports, and the ten T ports comprising two first T ports, each of the two first T ports being coupled with all of the four P ports; and
    the multiway switch being configured to be coupled with a radio frequency circuit of a wireless communication device through the ten T ports and be coupled with an antenna system of the wireless communication device through the four P ports, to implement a preset function of the wireless communication device, the antenna system comprising four antennas corresponding to the four P ports, and the preset function being a function of transmitting a sounding reference signal (SRS) through the four antennas in turn,
    wherein the wireless communication device is operable in a dual-frequency dual-transmit mode;
    the ten T ports further comprise eight second T ports, wherein four of the eight second T ports correspond to a first frequency band, and the other four of the eight second T ports correspond to a second frequency band;
    wherein each of the eight second T ports is coupled with one of the four P ports, and second T ports corresponding to the same frequency band among the eight second T ports are coupled with different P ports of the four P ports; and
    the two first T ports support only a transmission function, and the eight second T ports support only a reception function.

2. The multiway switch of claim 1, wherein the radio frequency circuit of the wireless communication device is formed by a plurality of independent circuit modules, and comprises two transmitter integrated circuits and eight receiver circuits; wherein
    each independent circuit module comprises at least one of the transmitter integrated circuit and the receiver circuit;
    each transmitter integrated circuit comprises two transmitter circuits being operable at different frequency bands and a transmit port, and the transmit ports of the two transmitter integrated circuits are coupled with the first T ports of the multiway switch one-to-one; and
    each receiver circuit comprises a receive port, and the receive ports of the eight receiver circuits are coupled with the second T ports of the multiway switch one-to-one.

3. The multiway switch of claim 2, wherein the radio frequency circuit is formed by two independent circuit modules, the two independent circuit modules comprise two first independent circuit modules, and each of the first independent circuit modules comprises:
    one first port and four second ports;
    a transmitter integrated circuit comprising two transmitter circuits being operable at different frequency bands, and a transmit port coupled with the first port of the first independent circuit module to which the transmitter integrated circuit belongs; and
    four receiver circuits comprising four receive ports coupled with the four second ports of the first independent circuit module one-to-one, wherein the first ports of the two first independent circuit modules are coupled with the first T ports of the multiway switch one-to-one, and the second ports of the two first independent circuit modules are coupled with the second T ports of the multiway switch one-to-one.

4. The multiway switch of claim 2, wherein the radio frequency circuit is formed by three independent circuit modules, the three independent circuit modules comprise two second independent circuit modules and one third independent circuit module, and each of the second independent circuit modules comprises one first port, the third independent circuit module comprises eight second ports, the first ports of the two second independent circuit modules are coupled with the first T ports of the multiway switch one-to-one, and the eight second ports are coupled with the second T ports of the multiway switch one-to-one;
    the second independent circuit module further comprises a transmitter integrated circuit, wherein the transmitter integrated circuit comprises two transmitter circuits being operable at different frequency bands, and a transmit port coupled with the first port of the second independent circuit module; and the third independent circuit module further comprises eight receiver circuits each having a receive port, and the receive ports of the eight receiver circuits are coupled with the eight second ports of the third independent circuit module one-to-one.

5. The multiway switch of claim 2, wherein the radio frequency circuit is formed by three independent circuit modules, the three independent circuit modules comprise two second independent circuit modules and one third independent circuit module, and each of the second independent circuit modules comprises one first port and two second ports, the third independent circuit module comprises four second ports, the first ports of the two second independent circuit modules are coupled with the first T ports of the multiway switch one-to-one, and the second ports of the two second independent circuit modules and the third independent circuit module are coupled with the second T ports of the multiway switch one-to-one;

the second independent circuit module further comprises a transmitter integrated circuit and two receiver circuits each having a receive port, wherein the transmitter integrated circuit comprises two transmitter circuits being operable at different frequency bands, and a transmit port coupled with the first port of the second independent circuit module; the receive ports of the two receiver circuits are coupled with the two second ports of the second independent circuit module one-to-one; and the third independent circuit module further comprises four receiver circuits each having a receive port, and the receive ports of the four receiver circuits are coupled with the four second ports of the third independent circuit module one-to-one.

6. The multiway switch of claim 2, wherein the radio frequency circuit is formed by four independent circuit modules, the four independent circuit modules comprise two fourth independent circuit modules and two fifth independent circuit modules, each of the fourth independent circuit modules comprises one first port, the fifth independent circuit module comprises four second ports, the first ports of the two fourth independent circuit modules are coupled with the first T ports of the multiway switch one-to-one, and the second ports of the two fifth independent circuit modules are coupled with the second T ports of the multiway switch one-to-one;

the fourth independent circuit module further comprises a transmitter integrated circuit, the transmitter integrated circuit comprises two transmitter circuits being operable at different frequency bands, and a transmit port coupled with the first port of the fourth independent circuit module; and the fifth independent circuit module further comprises four receiver circuits each having a receive port, and the receive ports of the four receiver circuits are coupled with the four second ports of the fifth independent circuit module one-to-one.

7. The multiway switch of claim 2, wherein the radio frequency circuit is formed by six independent circuit modules, the six independent circuit modules comprise two sixth independent circuit modules and four seventh independent circuit modules, each of the sixth independent circuit modules comprises one first port, the seventh independent circuit module comprises two second ports, the first ports of the two sixth independent circuit modules are coupled with the first T ports of the multiway switch one-to-one, and the second ports of the four seventh independent circuit modules are coupled with the second T ports of the multiway switch one-to-one;

the sixth independent circuit module further comprises a transmitter integrated circuit, the transmitter integrated circuit comprises two transmitter circuits being operable at different frequency bands, and a transmit port coupled with the first port of the sixth independent circuit module; and the seventh independent circuit module further comprises two receiver circuits each having a receive port, and the receive ports of the two receiver circuits are coupled with the two second ports of the seventh independent circuit module one-to-one.

8. The multiway switch of claim 2, wherein the radio frequency circuit is formed by eight independent circuit modules, the eight independent circuit modules comprise two eighth independent circuit modules and six ninth independent circuit modules, each of the eighth independent circuit modules comprises one first port and one second port, the ninth independent circuit module comprises one second port, the first ports of the two eighth independent circuit modules are coupled with the first T ports of the multiway switch one-to-one, and the second ports of the two eighth independent circuit modules and the six ninth independent circuit modules are coupled with the second T ports of the multiway switch one-to-one;

the eighth independent circuit module further comprises a transmitter integrated circuit and a receiver circuit, the transmitter integrated circuit comprise two transmitter circuits being operable at different frequency bands, and a transmit port coupled with the first port of the eighth independent circuit module, the receiver circuit has a receive port coupled with the second port of the eighth independent circuit module; and the ninth independent circuit module further comprises one receiver circuit having a receive port, and the receive port of the receiver circuit is coupled with the second port of the ninth independent circuit module.

9. The multiway switch of claim 2, wherein the radio frequency circuit is formed by ten independent circuit modules, the ten independent circuit modules comprise two tenth independent circuit modules and eight eleventh independent circuit modules, each of the tenth independent circuit modules comprises one first port, the eleventh independent circuit module comprises one second port, the first ports of the two tenth independent circuit modules are coupled with the first T ports of the multiway switch one-to-one, and the second ports of the eight eleventh independent circuit modules are coupled with the second T ports of the multiway switch one-to-one;

the tenth independent circuit module further comprises a transmitter integrated circuit, the transmitter integrated circuit comprise two transmitter circuits being operable at different frequency bands, and a transmit port coupled with the first port of the tenth independent circuit module; and the eleventh independent circuit module further comprises one receiver circuit having a receive port, and the receive port of the receiver circuit is coupled with the second port of the eleventh independent circuit module.

10. The multiway switch of claim 2, wherein
each receiver circuit comprises a low noise amplifier (LNA) and a filter, the filter has an input port coupled with a corresponding second T port of the multiway switch and an output port coupled with an input port of the LNA, and the LNA has an output port configured to be coupled with a corresponding port of a radio frequency transceiver; and each transmitter integrated circuit comprises two power amplifiers (PA), two filters, a coupler, and a switch, the PA has an input port configured to be coupled with a corresponding port of the radio frequency transceiver, and an output port coupled with an input port of the filter, the filter has an output port coupled with an input port of the coupler, the coupler has two output ports coupled with two selection ports of the switch one-to-one, and the switch has a common port coupled with a corresponding first T port of the multiway switch.

11. The multiway switch of claim 2, wherein the four antennas comprise a first antenna, a second antenna, a third antenna, and a fourth antenna; and the four antennas are antennas operable at a fifth generation new radio (5G NR) frequency band; or the first antenna and the fourth antenna are antennas operable at a long term evolution (LTE) frequency band and a 5G NR frequency band, and the second antenna and the third antenna are antennas only operable at the 5G NR frequency band.

12. The multiway switch of claim 11, wherein the antenna system further comprises a first connecting device and a second connecting device, wherein the first connecting device has a first port coupled with the first antenna, a second port coupled with a first receive path in LTE 4×4 multiple-input multiple-output (MIMO) configuration of the wireless communication device, and a third port coupled with a corresponding P port of the multiway switch; and the second connecting device has a first port coupled with the fourth antenna, a second port coupled with a second receive path in the LTE 4×4 MIMO configuration of the wireless communication device, and a third port coupled with a corresponding P port of the multiway switch, wherein the second connecting device comprises one of a combiner and a single-pole double-throw (SPDT) switch.

13. A radio frequency system, comprising an antenna system, a radio frequency circuit, and a multiway switch;

the multiway switch comprising ten T ports and four P ports, and the ten T ports comprising two first T ports, each of two first T ports being coupled with all of the four P ports;

the antenna system comprising four antennas corresponding to the four P ports; and the multiway switch being configured to be coupled with the radio frequency circuit through the ten T ports and be coupled with the antenna system through the four P ports, to implement a preset function of a wireless communication device, and the preset function being a function of transmitting an SRS through the four antennas in turn, wherein the wireless communication device is operable in a dual-frequency dual-transmit mode;

the ten T ports further comprise eight second T ports, wherein four of the eight second T ports correspond to a first frequency band, and the other four of the eight second T ports correspond to a second frequency band; wherein each of the eight second T ports is coupled with one of the four P ports, and second T ports corresponding to the same frequency band among the eight second T ports are coupled with different P ports of the four P ports; and the two first T ports support only a transmission function, and the eight second T ports support only a reception function.

14. The radio frequency system of claim 13, wherein the radio frequency circuit is formed by a plurality of independent circuit modules, and comprises two transmitter integrated circuits and eight receiver circuits; wherein each independent circuit module comprises at least one of the transmitter integrated circuit and the receiver circuit;

each transmitter integrated circuit comprises two transmitter circuits being operable at different frequency bands and a transmit port, and the transmit ports of the two transmitter integrated circuits are coupled with the first T ports of the multiway switch one-to-one; and each receiver circuit comprises a receive port, and the receive ports of the eight receiver circuits are coupled with the second T ports of the multiway switch one-to-one.

15. A wireless communication device, comprising an antenna system, a radio frequency transceiver, a radio frequency circuit coupled with the radio frequency transceiver, and a multiway switch;

the multiway switch comprising ten T ports and four P ports, and the ten T ports comprising two first T ports, each of two first T ports being coupled with all of the four P ports;

the antenna system comprising four antennas corresponding to the four P ports; and the multiway switch being configured to be coupled with the radio frequency circuit through the ten T ports and be coupled with the antenna system through the four P ports, to implement a preset function of the wireless communication device, and the preset function being a function of transmitting an SRS through the four antennas in turn, wherein the wireless communication device is operable in a dual-frequency dual-transmit mode;

the ten T ports further comprise eight second T ports, wherein four of the eight second T ports correspond to a first frequency band, and the other four of the eight second T ports correspond to a second frequency band; wherein each of the eight second T ports is coupled with one of the four P ports, and second T ports corresponding to the same frequency band among the eight second T ports are coupled with different P ports of the four P ports; and the two first T ports support only a transmission function, and the eight second T ports support only a reception function.

16. The wireless communication device of claim 15, wherein the radio frequency circuit is formed by a plurality of independent circuit modules, and comprises two transmitter integrated circuits and eight receiver circuits; wherein each independent circuit module comprises at least one of the transmitter integrated circuit and the receiver circuit;

each transmitter integrated circuit comprises two transmitter circuits being operable at different frequency bands and a transmit port, and the transmit ports of the two transmitter integrated circuits are coupled with the first T ports of the multiway switch one-to-one; and each receiver circuit comprises a receive port, and the receive ports of the eight receiver circuits are coupled with the second T ports of the multiway switch one-to-one.

17. The wireless communication device of claim 16, wherein each transmitter circuit comprises an input port, and each input port of the transmitter circuit is coupled with a corresponding port of the radio frequency transceiver; and each receiver circuit comprises an output port, and each output port of the receiver circuit is coupled with a corresponding port of the radio frequency transceiver.

18. The wireless communication device of claim 16, wherein each receiver circuit comprises a low noise amplifier (LNA) and a filter, the filter has an input port coupled with a corresponding second T port of the multiway switch and an output port coupled with an input port of the LNA, and the LNA has an output port configured to be coupled with a corresponding port of a radio frequency transceiver; and each transmitter integrated circuit comprises two power amplifiers (PA), two filters, a coupler, and a switch, the PA has an input port configured to be coupled with a corresponding port of the radio frequency transceiver, and an output port coupled with an input port of the filter, the filter has an output port coupled with an input port of the coupler, the coupler has two output ports coupled with two selection ports of the switch one-to-one, and the switch has a common port coupled with a corresponding first T port of the multiway switch.

19. The wireless communication device of claim 16, wherein the four antennas comprise a first antenna, a second antenna, a third antenna, and a fourth antenna; and the four antennas are antennas operable at a fifth generation new radio (5G NR) frequency band; or the first antenna and the fourth antenna are antennas operable at a long term evolution (LTE) frequency band and a 5G NR frequency band, and the second antenna and the third antenna are antennas only operable at the 5G NR frequency band.

20. The wireless communication device of claim 19, wherein the antenna system further comprises a first connecting device and a second connecting device, wherein the first connecting device has a first port coupled with the first antenna, a second port coupled with a first receive path in LTE 4×4 multiple-input multiple-output (MIMO) configuration of the wireless communication device, and a third port coupled with a corresponding P port of the multiway switch; and the second connecting device has a first port coupled with the fourth antenna, a second port coupled with a second receive path in the LTE 4×4 MIMO configuration of the wireless communication device, and a third port coupled with a corresponding P port of the multiway switch, wherein the second connecting device comprises one of a combiner and a single-pole double-throw (SPDT) switch.

* * * * *